(12) United States Patent
Cunningham (10) Patent No.: US 11,851,255 B2
(45) Date of Patent: Dec. 26, 2023

(54) BEVERAGE LID WITH BUILT-IN STIRRER

(71) Applicant: Bobby Ray Cunningham, Bossier City, LA (US)

(72) Inventor: Bobby Ray Cunningham, Bossier City, LA (US)

(*) Notice: Subject to any disclaimer, the term of this patent is extended or adjusted under 35 U.S.C. 154(b) by 484 days.

(21) Appl. No.: 16/382,150

(22) Filed: Apr. 11, 2019

(65) Prior Publication Data

US 2020/0324947 A1   Oct. 15, 2020

(51) Int. Cl.
| | | |
|---|---|---|
| B65D 51/32 | (2006.01) | |
| B01F 27/90 | (2022.01) | |
| B01F 27/112 | (2022.01) | |
| B01F 35/32 | (2022.01) | |
| A47G 19/22 | (2006.01) | |
| B01F 101/14 | (2022.01) | |
| B65D 43/02 | (2006.01) | |

(52) U.S. Cl.
CPC ........... *B65D 51/32* (2013.01); *B01F 27/112* (2022.01); *B01F 27/90* (2022.01); *B01F 35/3202* (2022.01); *B65D 43/0202* (2013.01); *A47G 19/2205* (2013.01); *B01F 2101/14* (2022.01); *B65D 2543/00046* (2013.01); *B65D 2543/00092* (2013.01)

(58) Field of Classification Search
None
See application file for complete search history.

(56) References Cited

U.S. PATENT DOCUMENTS

| | | | | |
|---|---|---|---|---|
| 4,854,718 | A * | 8/1989 | Wang ................... | A47J 43/0711 366/252 |
| 5,407,270 | A * | 4/1995 | Barile .................... | A47J 43/27 366/247 |
| 5,623,865 | A * | 4/1997 | Sidiropoulos ......... | A47G 19/16 99/323 |
| 9,706,878 | B1 * | 7/2017 | Campbell .......... | B01F 15/00006 |
| 2008/0259718 | A1 * | 10/2008 | Agardici .............. | A47G 21/004 366/129 |
| 2012/0107455 | A1 * | 5/2012 | Briggs .................... | A47J 31/20 426/78 |
| 2015/0164253 | A1 * | 6/2015 | Taylor .............. | B01F 15/00792 220/212 |

* cited by examiner

*Primary Examiner* — Erik Kashnikow
*Assistant Examiner* — Thanh H Nguyen
(74) *Attorney, Agent, or Firm* — R. Keith Harrison (57) ABSTRACT

An apparatus for stirring the contents of a beverage cup without removing the lid. The lid of the cup is equipped with a rotating disk. A shaft having a finger tab at its top and a paddle device at its bottom traverses the disk in an offset position relative to the center of the disk. When the disk is rotated by the shaft, the paddle is dragged through the beverage, thus stirring the beverage.

12 Claims, 8 Drawing Sheets

BEVERAGE LID WITH BUILT-IN STIRRER

CROSS-REFERENCE TO RELATED APPLICATIONS

Provisional application No. 62/482,894 filed by Bob Cunningham entitled Beverage Lid With a Built-in Stirrer on Apr. 7, 2017.

BACKGROUND OF THE INVENTION

In earlier, more leisurely times, the consumption of beverages was most often done in a structured, more formal setting. Whether sitting at a dining table drinking tea from a goblet or sitting on a freshly cut stump in the forest drinking coffee from a thermos lid, the beverage was usually the center of the activity. In most cases, except perhaps for holding a conversation, you did little else but drink your beverage. As beverage consumption became more popular, time became more valuable, and life became more hectic, the need for a lid to prevent the spilling of the beverage became necessary. Perhaps the best example of this situation is the consumption of beverages while driving an automobile. It is a simple enough proposition: fill your cup, snap on your lid with drinking hole, and enjoy your beverage while doing other complicated tasks. There is, however, one remaining complication: a problem that is solved by the present invention. In many beverages, in order to achieve the maximum enjoyment, certain condiments such as cream or sugar must be added. Until now, this required the removal of the lid and the employment of some kind of stirring tool. As the beverage is sloshed about and the stirrer is disposed of, spills may occur. This is a common, persistent problem that is solved by the present invention.

DESCRIPTION OF THE PRIOR ART

Until the present invention, there were no practical designs for beverage lids with built-in stirrers. Lids are simply made to a specific size in order to accommodate rigidly affixing them to a specific cup or container. Often holes for straws or apertures for drinking through are included, but no means for stirring are provided.

DETAILED DESCRIPTION

Figure 1:
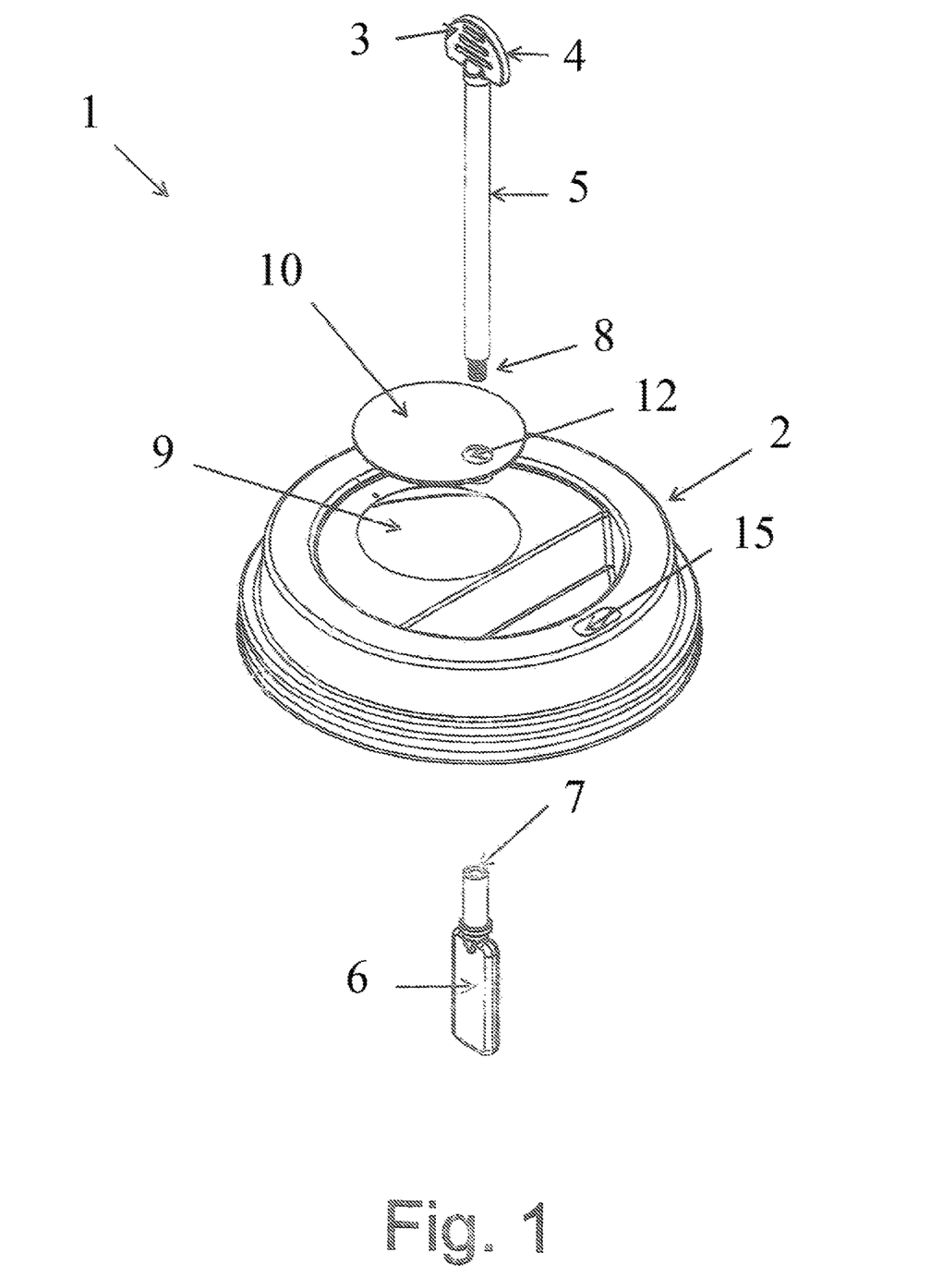
FIG. 1 is an explosion view of the beverage lid with built-in stirrer.
Figure 2:
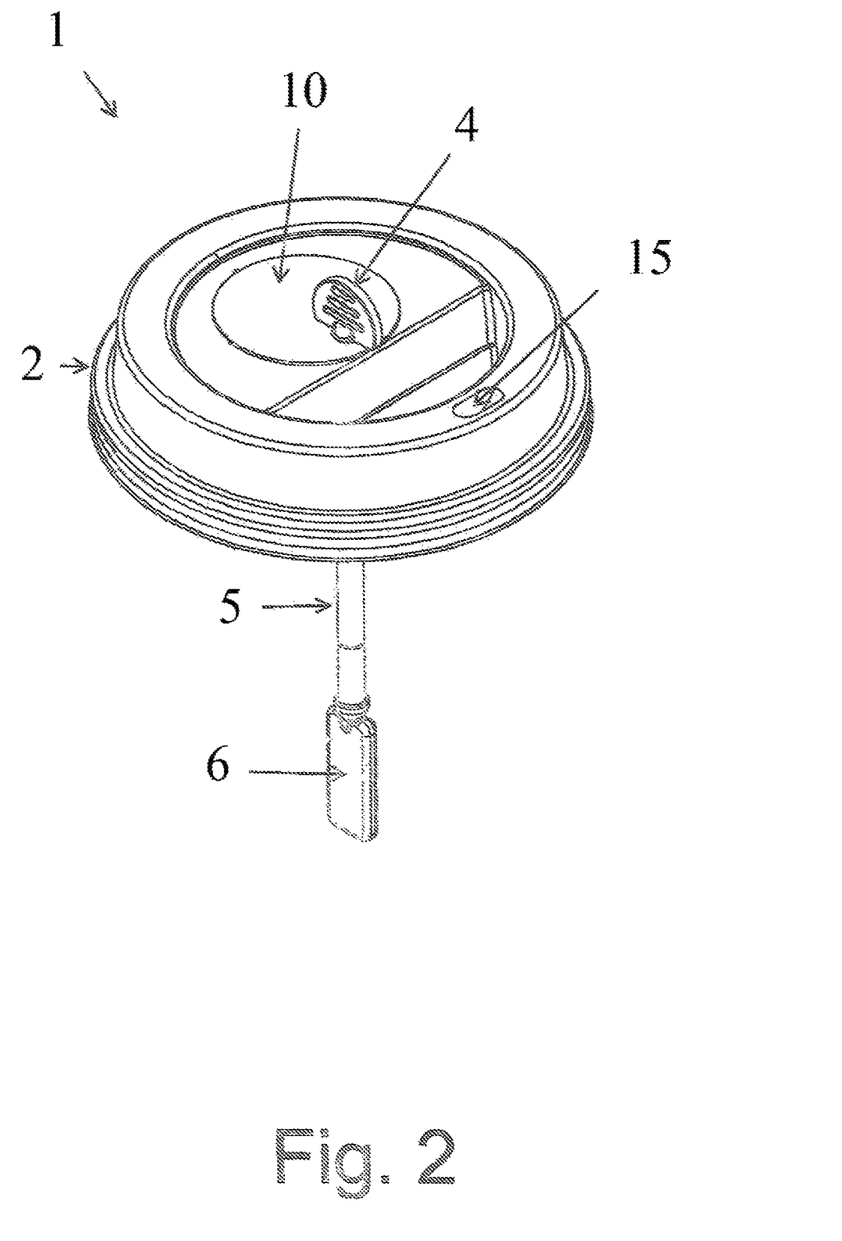
FIG. 2 is a perspective view of the beverage lid with built-in stirrer.
Figure 3:
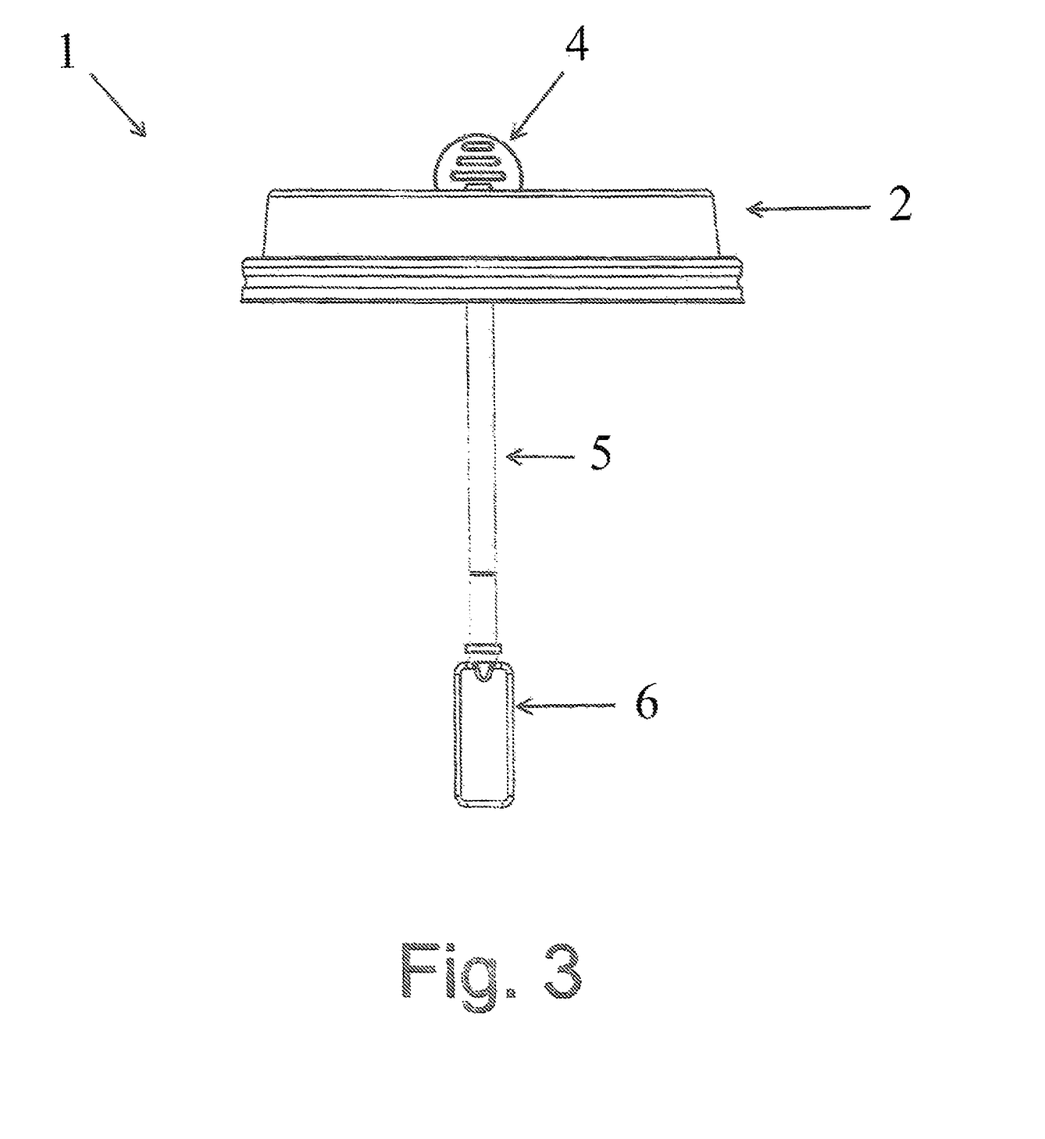
FIG. 3 is a front elevation view of the beverage lid with built-in stirrer.
Figure 4:
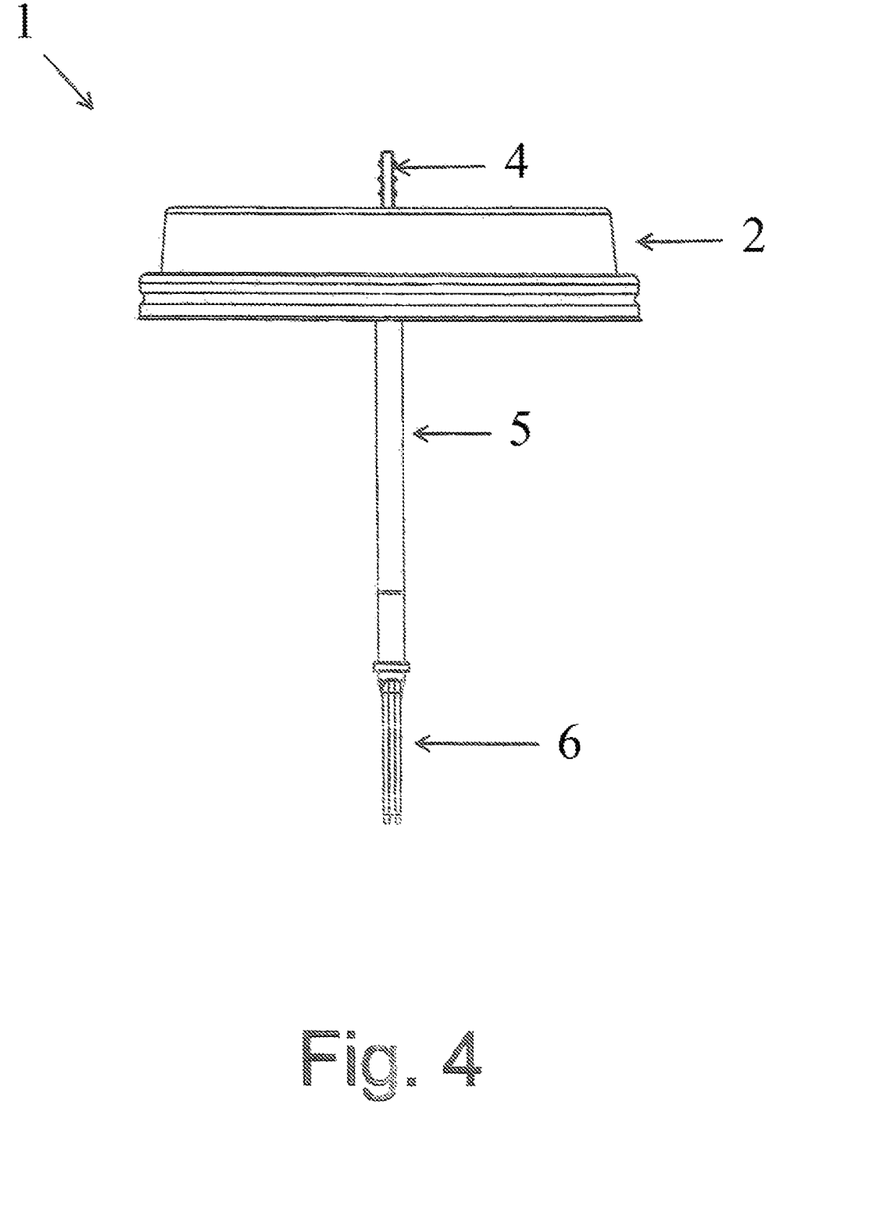
FIG. 4 is a side elevation view of the beverage lid with built-in stirrer.
Figure 5:
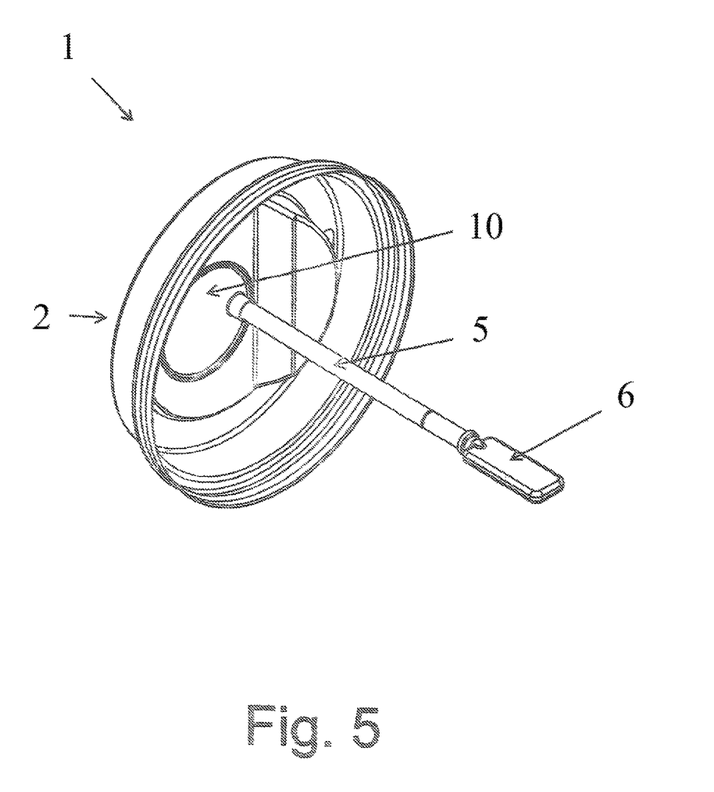
FIG. 5 is a bottom perspective view of the beverage lid with built-in stirrer.
Figure 6:
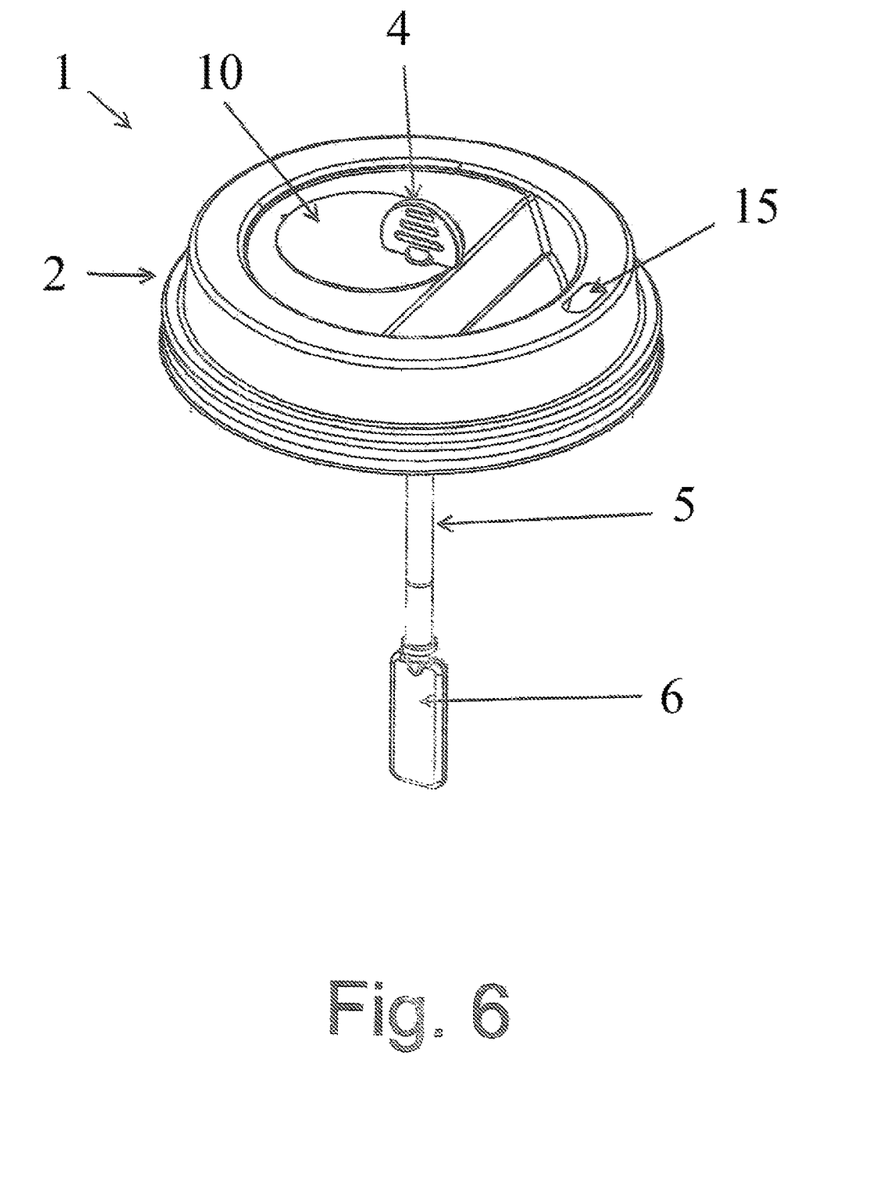
FIG. 6 is a top perspective view of the beverage lid with built-in stirrer.
Figure 7:
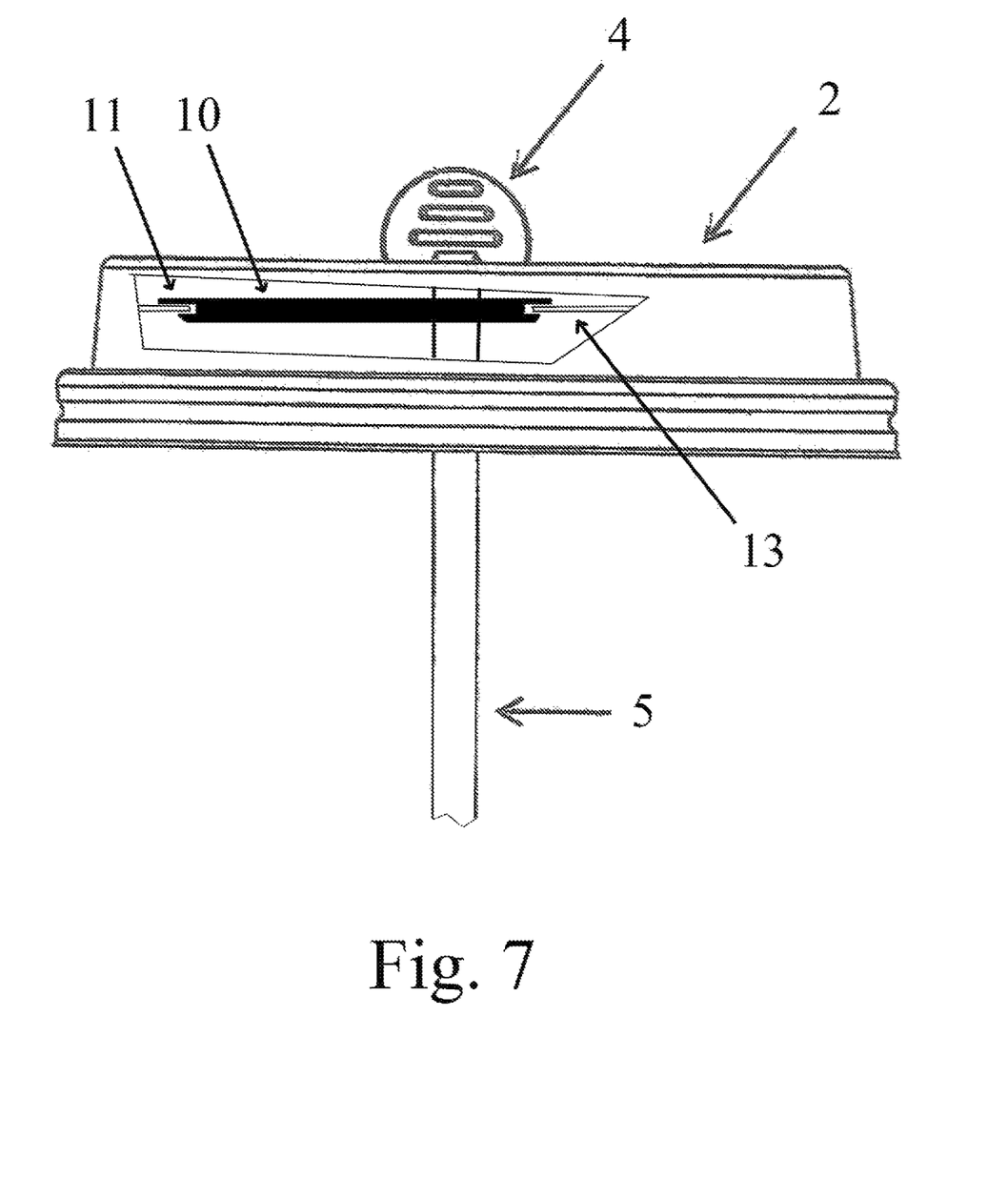
FIG. 7 is a cutaway view showing the engagement of the inner rotary plate and the medially positioned opening.

Referring to the drawings and more specifically to FIG. 1, it can be seen that the beverage lid with built-in stirrer 1 comprises a lid member 2 and a mixing assembly 3. Mixing assembly 3 further comprises a finger tab 4, a shaft 5, and a stirring paddle 6. Finger tab 4 is affixed to the top of shaft 5. The bottom of shaft 5 is removable, affixed to stirring paddle 6 by way of male threads 7 and female threads 8. This is one option; however, there are any number of methods by which stirring paddle 6 may be rigidly affixed to shaft 5. Finger tab 4 is generally in the shape of a half disk, with grip lines embedded therein. Finger tab 4 could be any number of shapes and other methods of design may be employed in order to improve grip. As seen in FIG. 7, the lid member 2 also comprises a top plate 13. Top plate 13 further comprises a circular, medially positioned opening 9 and an inner rotary plate 10 designed to be rotationally fitted within the medially positioned opening 9.

Referring to FIGS. 1 and 7, it can be seen that inner rotary plate 10, which is generally a flat, round disk, is fitted into medially positioned opening 9 by way of a slotted rim 11. Inner rotary plate 10 may be snapped in and out of medially positioned opening 9 for cleaning and adding of condiments.

Referring again to FIG. 1, it can be seen that inner rotary plate 10 is also equipped with an opening 12. Opening 12 is located near the slotted rim 11 and is therefore off center with regard to inner rotating plate 10. Shaft 5 extends downward through opening 12 in inner rotary plate 10 and is affixed to stirring paddle 6. An aperture 15 for drinking from the cup with the beverage lid with built-in stirrer affixed to the cup is provided near the cup's rim across from the inner rotating disk 10.

Figure 8:
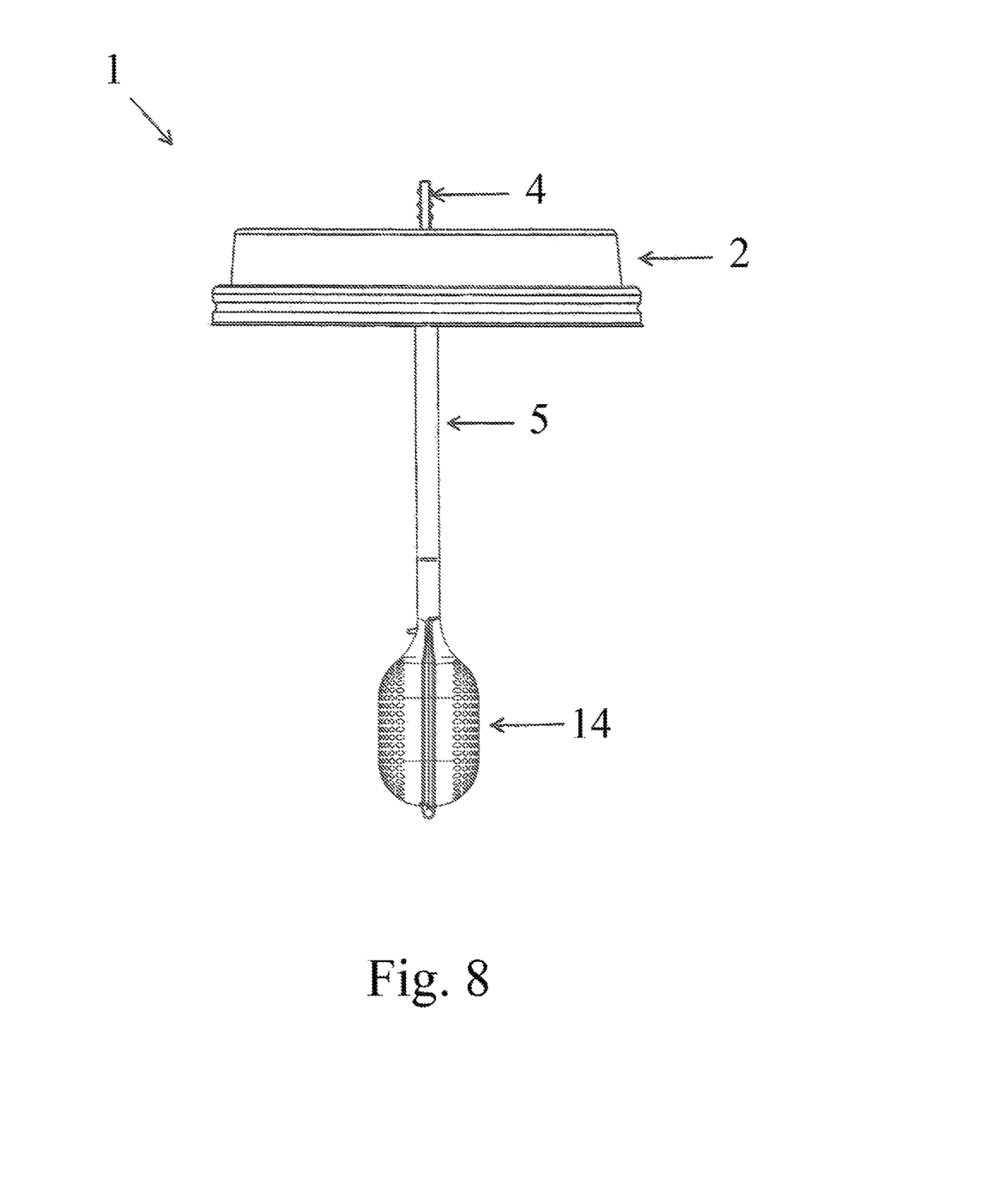
FIG. 8 is an elevation view of the beverage lid with built-in stirrer with a product diffuser employed as the stirrer.

Referring to FIG. 8, it can be seen that a product diffuser 14 is employed as the stirring paddle. The product diffuser 14 comprises a pouch in which condiments, sweeteners, flavoring agents and the like may be placed. The walls of the product diffuser are perforated so that the contents of the product diffuser will be gradually infused into the contents of the cup as the contents of the cup are stirred. In order to use the beverage lid with built-in stirrer, after the desired condiments are added and the lid is affixed to the beverage cup, the user takes finger tab 4 between his or her thumb and index finger and applies rotational force in either direction so that the inner rotary plate 10 will be moved rotationally within medially positioned opening 9. Shaft 5 rotates within opening 12 as the rotational force is applied, causing shaft 5 to travel in a circular motion within medially positioned opening 9. Stirring paddle 6, being affixed to the bottom end of shaft 5, is dragged along in a circular motion within the beverage, thus stirring the condiments evenly within the beverage. Medially positioned opening 9 is suitably sized and offset from the center of lid member 2 so as not to interfere with drinking aperture 15 or other such features while the beverage is being stirred.

I claim:

1. A device for stirring a beverage within a sealed beverage container comprising, A a lid member configured to seal said container, said lid member further comprising a top plate, said top plate being generally flat and affixable to said container by said lid member, said lid member further comprising a drinking aperture, said top plate further comprising a circular, medially positioned opening off center with respect to said top plate, said medially positioned opening having an edge;

B a mixing assembly carried by the lid member and configured for stirring said beverage, said mixing assembly having;

an elongated, continuous, straight shaft with a top end and a bottom end;

a finger grip member rotatably affixed to said top end of said shaft; and a stirring member and a product diffuser, wherein said stirring member and said product diffuser are interchangeable with etch other on said bottom end of said shaft;

C an inner rotary plate disposed in said medially positioned opening for mounting said mixing assembly to said top plate of said lid member, said inner rotary plate having an opening off center with respect to the inner rotary plate and said inner rotary plate having a plate center. said finger grip member rotatable with respect to said inner rotary plate:

D wherein said shaft of said mixing assembly extends through said opening in said inner rotary plate with said top end of said shaft above and said bottom end of said shaft below said inner rotary plate and said lid member; and E wherein said inner rotary plate rotates with respect to said shaft and said shaft revolves around said center of said inner rotary plate responsive to rotation of said inner rotary plate in said medially positioned opening by gripping of said shaft at said top end and application of stirring movements to said shaft of said mixing assembly.

2. The device as described claim 1, wherein said inner rotary plate comprises a slotted rim, said slotted rim being formed into said outer edge of said inner rotary plate, said outer edge being suitably larger in circumference than said medially positioned opening, said edge of said medially positioned opening being snapped into said slotted edge of said inner rotary plate.

3. The device as described in claim 2, wherein said bottom end of said shaft and said stirring member and said product diffuser arc equipped with complementary threads, said shaft being rigidly affixed to the selected one of said stirring member and said product diffuser by engagement of said threads.

4. The device as described in claim 3, wherein said stirring member further comprises a paddle.

5. The device as described in claim 3, wherein said product diffuser comprises a product diffusing container, said product diffusing container having outer wails, said outer walls having a plurality of perforations through which contents of said product diffusing container may he diffused.

6. A device for stirring a beverage within a sealed beverage container comprising:

A a lid member configured to seal said container, said lid member further comprising a top plate, said top plate being generally flat and affixable to said container by said lid member. said lid member further comprising a drinking aperture, said top plate further comprising a circular, medially positioned opening oft center with respect to said top plate, said medially positioned opening having an edge;

B a mixing assembly carried by the lid member and configured for stirring said beverage, said mixing assembly including an elongated, continuous, straight shaft-having a top end and a bottom end, a finger grip member rotatably affixed to the top end of said shaft and a selected one of a stirring paddle and a product diffusing container at said bottom end of said shaft, said product diffusing container haying outer walls said outer walls having a plurality of perforations through which contents of said product diffusing container may be diffused, said stirring paddle and said product diffusing container releasably and interchangeably attachable to said bottom end of said shaft;

C an inner rotary plate disposed in said medially positioned opening for mounting said mixing assembly to said top plate of said lid member, said inner rotary plate having an opening off center with respect to the inner rotary plate and said inner rotary plate having a plate center, said linger grip member rotatable with respect to said inner rotary plate; and D wherein said shaft of said mixing assembly extends through said opening in said inner rotary plate with said top end of said shaft above and said bottom end of said shaft below said inner rotary plate and said lid member; and E wherein said inner rotary plate rotates with respect to said shaft and said shaft revolves around said center of said inner rotary plate responsive to rotation of said inner rotary plate in said medially positioned opening by gripping of said shaft at said top end and application of stirring movements to said shaft of said mixing assembly.

7. The device as described in claim 6, wherein said bottom end of said shaft and said stirring paddle and said product diffusing container a equipped with complementary threads, said shaft being rigidly affixed to a selected one of said stirring paddle and said product diffusing container by engagement of said threads.

8. A device for stirring a beverage within a sealed beverage container comprising:

A a lid member configured to seal said container, said lid member further comprising a top plate, said top plate being generally flat and affixable to said container by said lid member, said lid member further comprising a drinking aperture, said top plate further comprising a circular, medially positioned opening off center with respect to said top plate, said medially positioned opening having an edge;

B a mixing, assembly carried by the lid member and configured for stirring said beverage, said mixing assembly having:

an elongated, continuous, straight shaft with a top end and a bottom end;

a finger grip member rotatably affixed to said top end of said shaft; and a selected one of a stirring member and a product diffuser on said bottom end of said shaft, said stirring member and said product diffusing container releasably and interchangeably attachable to said bottom end of said shall;

C an inner rotary plate disposed in said medially positioned opening for mounting said mixing assembly to said top plate of said lid member, said inner rotary plate having an opening off center with respect to the inner rotary plate and said inner rotary plate having a plate center, said linger grip member rotatable with respect m said inner rotary plate;

D wherein said shaft of said mixing assembly extends through said opening in said inner rotary plate with said top end of said shaft above and said bottom end of said shaft below said inner rotary plate and said lid member; and E wherein said inner rotary plate rotates with respect to said shaft and said shalt revolves around said center of said inner rotary plate responsive to rotation of said inner rotary plate in said medially positioned opening by gripping of said shaft at said top end and application of stirring movements to said shaft of said mixing assembly.

9. The device as described claim 8, wherein said inner rotary plate comprises a slotted rim, said slotted rim being formed into said outer edge of said inner rotary plate, said outer edge being suitably larger in circumference than said medially positioned opening, said edge of said medially positioned opening being snapped into said slotted edge of said inner rotary plate.

10. The device as described in claim 8, wherein said bottom end of said shaft and said stirring member and said product diffuser are equipped with complementary threads, said shaft being rigidly affixed to the selected one of said stirring member and said product diffuser by engagement of said threads.

11. The device as described in claim 8, wherein said stirring member further comprises a paddle.

12. The device as described in claim 8, wherein said product diffuser comprises a product diffusing container, said product diffusing container having outer walls, said outer walls having a plurality of perforations through which contents of said product diffusing container may be diffused.

* * * * *